(12) United States Patent
Bunker et al.

(10) Patent No.: US 10,487,677 B2
(45) Date of Patent: Nov. 26, 2019

(54) TURBINE COMPONENT HAVING A SEAL SLOT AND ADDITIVE MANUFACTURING PROCESS FOR MAKING SAME

(71) Applicant: General Electric Company, Schenectady, NY (US)

(72) Inventors: Ronald Scott Bunker, West Chester, OH (US); Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 812 days.

(21) Appl. No.: 14/936,783

(22) Filed: Nov. 10, 2015

(65) Prior Publication Data

US 2017/0130599 A1  May 11, 2017

(51) Int. Cl.

| | |
|---|---|
| *F01D 11/00* | (2006.01) |
| *B22F 3/105* | (2006.01) |
| *B22F 7/02* | (2006.01) |
| *B28B 1/00* | (2006.01) |
| *B22F 5/00* | (2006.01) |
| *B22F 7/08* | (2006.01) |

(Continued)

(52) U.S. Cl.
CPC .......... *F01D 11/005* (2013.01); *B22F 3/1055* (2013.01); *B22F 5/009* (2013.01); *B22F 7/02* (2013.01); *B22F 7/08* (2013.01); *B23K 26/342* (2015.10); *B28B 1/001* (2013.01); *B29C 64/153* (2017.08); *B33Y 80/00* (2014.12); *C04B 35/64* (2013.01); *F01D 9/041* (2013.01); *B22F 5/04* (2013.01); *B22F 2999/00* (2013.01); *B29L 2031/08* (2013.01); *B33Y 10/00* (2014.12); *F05D 2220/32* (2013.01); *F05D 2230/30* (2013.01); *F05D 2240/128* (2013.01); *F05D 2240/55* (2013.01); *F05D 2260/36* (2013.01); *F05D 2300/17* (2013.01); *Y02P 10/295* (2015.11); *Y02T 50/672* (2013.01)

(58) Field of Classification Search
None
See application file for complete search history.

(56) References Cited

U.S. PATENT DOCUMENTS

| | | |
|---|---|---|
| 1,423,466 A | 7/1922 | Snyder |
| 5,997,251 A | 12/1999 | Lee |

(Continued)

FOREIGN PATENT DOCUMENTS

| | | |
|---|---|---|
| DE | 10 2013 205 922 A1 | 10/2014 |
| EP | 2685170 | 1/2014 |

(Continued)

OTHER PUBLICATIONS

Gibson et al. "Additive Manufacturing Technologies" Springer 2010. (Year: 2010).*

(Continued)

*Primary Examiner* — Paul A Wartalowicz
*Assistant Examiner* — Stephani Hill
(74) *Attorney, Agent, or Firm* — General Electric; Kristi Davidson

(57) ABSTRACT

A method of forming a structure in a turbine component having a seal slot, the slot including walls defining an opening therebetween, the method includes the step of using an additive manufacturing process to form a neck structure on a wall so as to reduce a size of the opening.

13 Claims, 15 Drawing Sheets

(51) Int. Cl.
*B29C 64/153* (2017.01)
*B33Y 10/00* (2015.01)
*B33Y 80/00* (2015.01)
*B23K 26/342* (2014.01)
*C04B 35/64* (2006.01)
*F01D 9/04* (2006.01)
*B29L 31/08* (2006.01)
*B22F 5/04* (2006.01)

(56) References Cited

U.S. PATENT DOCUMENTS

| | | | |
|---|---|---|---|
| 8,632,311 | B2 | 1/2014 | Klasing et al. |
| 9,334,747 | B2 | 5/2016 | Cernay et al. |
| 9,416,675 | B2 * | 8/2016 | Lacy .................... F01D 11/005 |
| 2007/0212215 | A1 | 9/2007 | Ferber et al. |
| 2011/0081235 | A1 | 4/2011 | Shah et al. |
| 2013/0189086 | A1 * | 7/2013 | Bayer .................... F01D 25/00 415/173.1 |
| 2013/0266447 | A1 | 10/2013 | Evans et al. |
| 2014/0079540 | A1 * | 3/2014 | Morris .................... B22F 3/1055 415/178 |
| 2014/0346741 | A1 | 11/2014 | Takagi |
| 2016/0047262 | A1 * | 2/2016 | Cernay .................... F16J 15/3252 277/355 |
| 2016/0215640 | A1 * | 7/2016 | Bergman .................... F16J 15/0887 |
| 2016/0281521 | A1 * | 9/2016 | Clum .................... F01D 11/005 |

FOREIGN PATENT DOCUMENTS

| | | | |
|---|---|---|---|
| WO | 2014121060 | 8/2014 | |
| WO | 2014150490 | 9/2014 | |
| WO | WO-2014161527 A2 * | 10/2014 | ........... F16J 15/3252 |

OTHER PUBLICATIONS

Partial European Search Report and Opinion issued in connection with corresponding EP Application No. 16198106.3 dated Jun. 8, 2017.

Extended European Search Report and Opinion issued in connection with corresponding EP Application No. 16198106.3 dated Oct. 23, 2017.

* cited by examiner

TURBINE COMPONENT HAVING A SEAL SLOT AND ADDITIVE MANUFACTURING PROCESS FOR MAKING SAME

BACKGROUND OF THE INVENTION

The present invention relates to seals for the reduction of leakage between turbine components and more specifically to seal slots in nozzle segments having complex profiles and an additive manufacturing process for making such seal slots.

Gas turbine engine components such as turbine nozzles are often configured as a ring of side-by-side segments. It is known that leakage at the gap between adjacent segments leads to inefficiencies in aircraft engines. Conventional ways to reduce this leakage include installation of sealing slots and splines positioned such that leakage pathways between the segments are blocked or impeded. In this regard, each segment has an edge having a spline slot formed therein. Adjacent spline slots of two adjacent segments are configured to receive opposite sides of the same spline. In this manner, leakage pathways along the gap between two adjacent segments are reduced by cooperatively engaged splines and spline slots.

Conventional spline slots are configured to receive a spline and in this regard are often configured as generally U-shaped channels. Some conventional spline slots have parallel sides that are spaced-apart a predetermined width. Corresponding splines are configured such that they are narrower than this width such that the spline can be received within the spline slot.

One problem with conventional spline slots and splines is that leakage occurs through pathways defined between the substantially parallel spline and adjacent wall of the spline slot.

Another problem with conventional spline slots and methods for forming them is that the ability to leave a blind access region behind additional features cannot be accommodated by casting, and would require extreme measures to machine thereby leading to highly variable results.

Another problem with conventional spline slots and spline configurations is that the spline can be removed from a spline slot inadvertently.

BRIEF DESCRIPTION OF THE INVENTION

At least one of the foregoing problems is addressed by a spline slot having a cross-sectional profile that varies from the bottom of the spline slot to the top.

According to one aspect of the present invention, there is provided a method of forming a sealing structure in a turbine component that has a seal slot. The seal slot includes walls that define an opening therebetween. The method includes using an additive manufacturing process to form a neck structure on at least one of the walls so as to reduce a size of the opening.

According to another aspect of the present invention, there is provided a method of forming a sealing structure in a turbine component having a seal slot sequentially with a spline seal. The slot includes walls that define an opening therebetween and at least a portion of the spline seal positioned in the opening. The method includes using an additive manufacturing process to form a neck structure on at least one of the walls so as to reduce a size of the opening and to form a spline seal positioned within the opening.

According to yet another aspect of the present invention, there is provided a sealing apparatus for a gas turbine engine. The sealing apparatus includes a component having a seal slot, the slot including spaced-apart lateral walls defining an opening therebetween. A spline seal is disposed in the seal slot, the spline seal having an enlarged portion with a predetermined first dimension. The sealing apparatus also includes a trapping element of the seal slot defining a second dimension smaller than first dimension so as to trap the seal in the seal slot.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
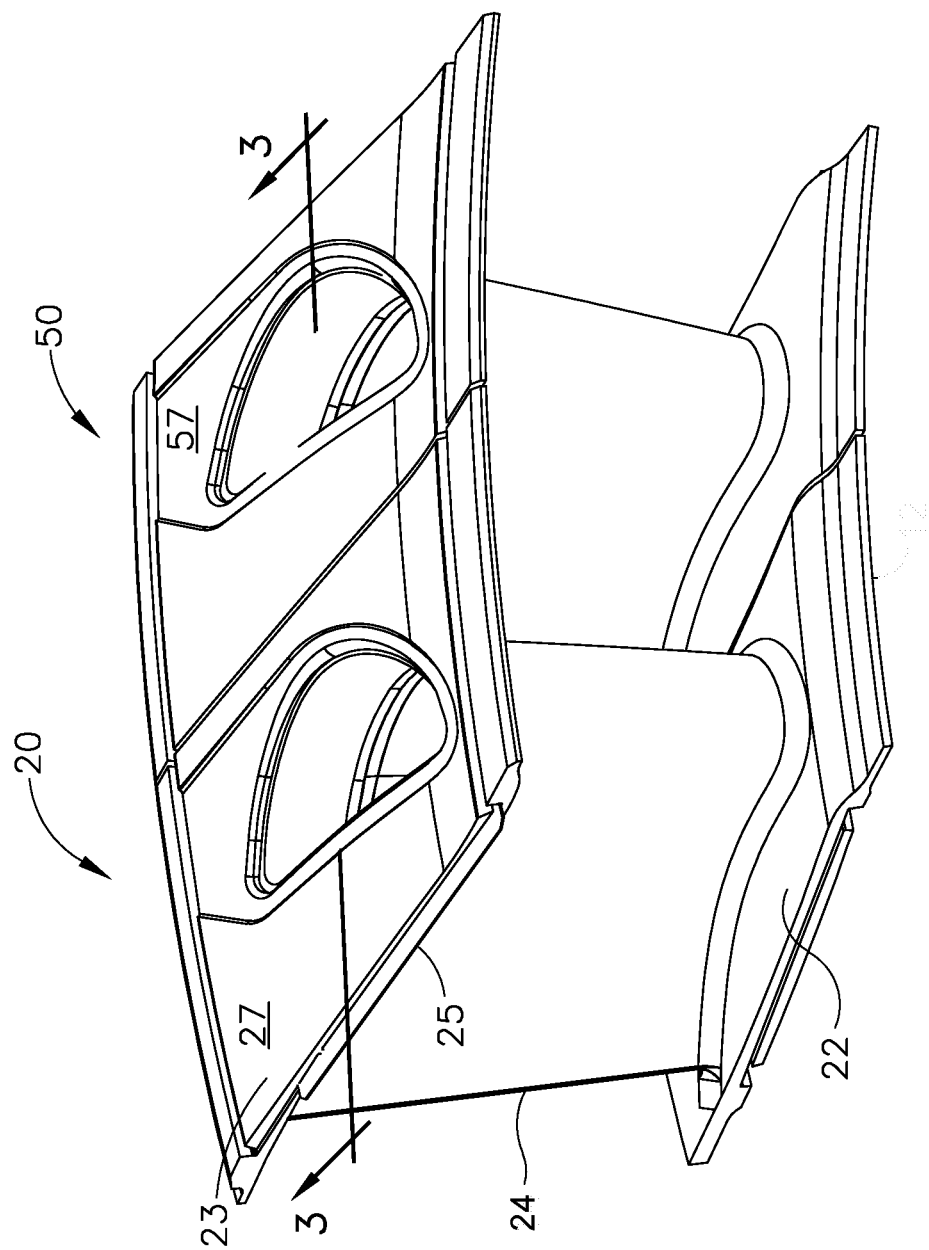
FIG. 1 is a perspective view of two nozzle segments that together form a sealing apparatus.
Figure 2:
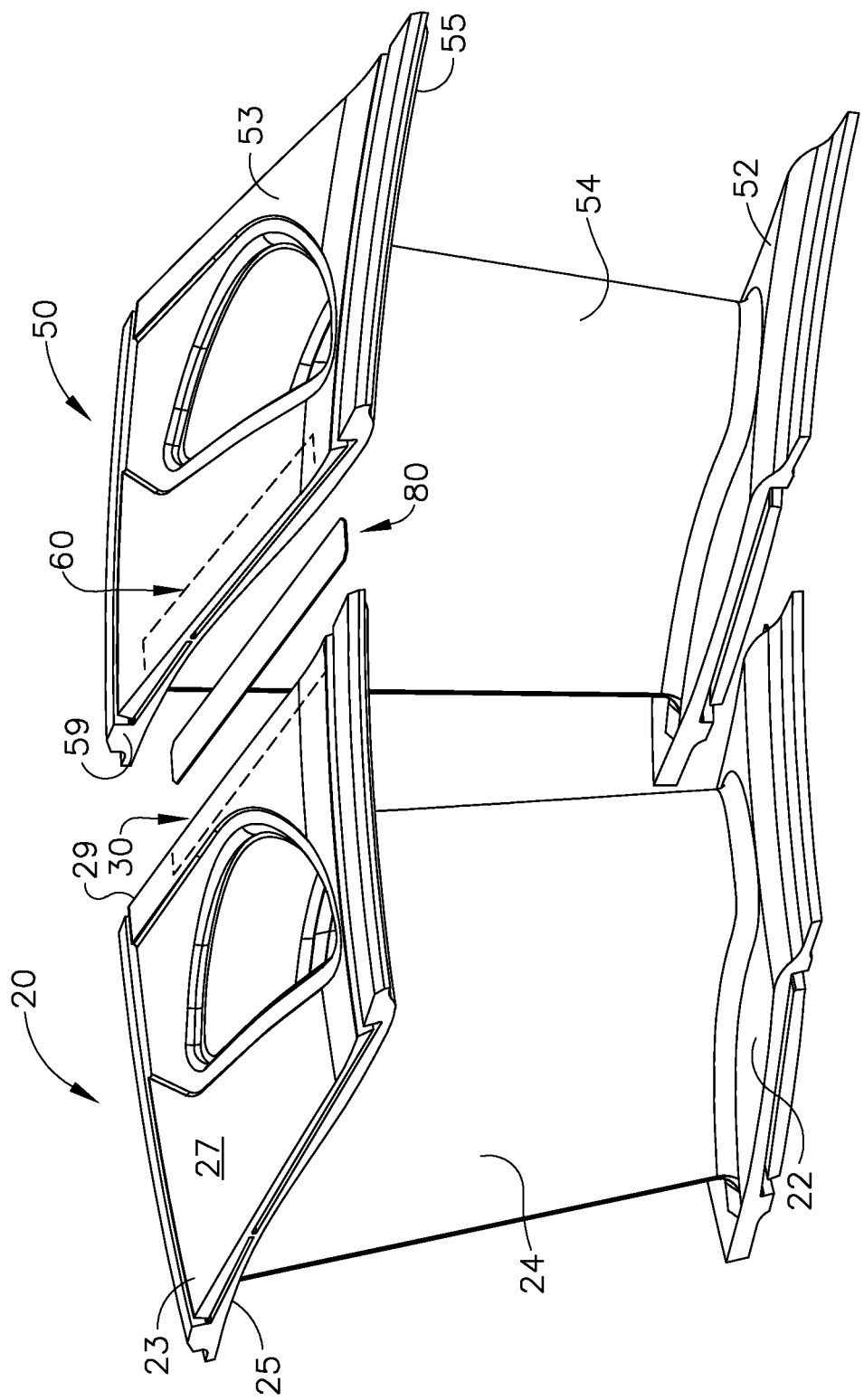
FIG. 2 is an exploded perspective view of FIG. 1.
Figure 3:
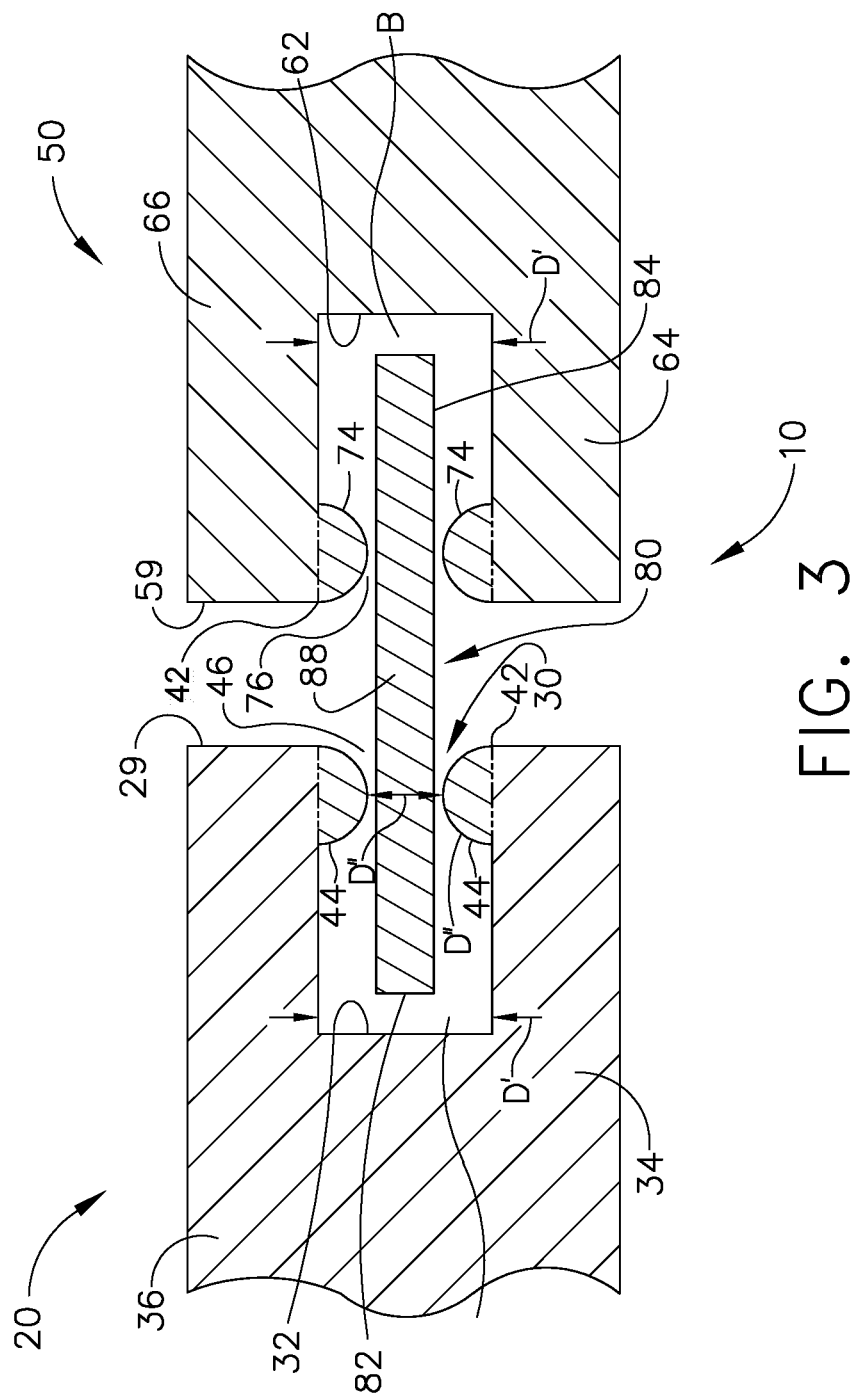
FIG. 3 is a partial view of the apparatus shown in FIG. 1 taken along the line 3-3.

Referring to the drawings wherein identical reference numerals denote the same elements throughout the various views, FIGS. 1-3 show an exemplary sealing apparatus 10.

Sealing apparatus 10 is configured to reduce leakage through a gap between a first nozzle segment 20 and a second nozzle segment 50. It should be noted that the nozzle segment 20 and 50 are used merely as examples. The principles described herein may be applied to any set of turbine components which are assembled with a spline seal therebetween.

The first nozzle segment 20 includes an inner band 22 that is connected to an outer band 23 by an airfoil 24. The outer band 23 has an inboard surface 25 and an outboard surface 27. An end face 29 of the outer band 23 is positioned between the inboard surface 25 and the outboard surface 27.

Referring now to FIGS. 1-3, a spline slot 30 is defined in the outer band 23 and extends inward from the end face 29 and is configured to receive a spline seal 80. The spline slot 30 is defined in the outer band 23 such that the spline slot 30 is defined by a bottom 32, an inboard wall 34 and an outboard wall 36. Two end walls (not shown) are positioned opposite each other and extend from bottom 32 along the inboard wall 34 and the outboard wall 36 to the end face 29. Inboard wall 34, the second wall 36, and the end walls extend from the bottom 32 to a rim 42 at the end face 29.

Referring now to FIG. 3, the inboard wall 34 and the outboard wall 36 are spaced apart a first distance D' near the bottom 32. A rib 44 is formed on at least one of the inboard wall 34 and the outboard wall 36 such that the rib 44 defines a surface that extends away from a plane generally defined by the respective wall.

In the illustrated example the rib 44 has a convex curved cross-sectional shape; for example the cross-section may be semicircular. In the completed component, the rib 44 is part of an integral, unitary, or monolithic whole with the remainder of the seal slot 30, but may be formed separately from the remainder of the seal slot 30, as shown by the dashed lines. As will be described in further detail below, the rib 44 may be formed using an additive manufacturing process.

Rib 44 defines a neck 46 in the spline slot 30 such that the shortest distance between the inboard wall 34 and the outboard wall 36 is narrower at the neck 46 than shortest distance near the bottom 32. The shortest distance between the inboard wall 34 and the outboard wall 36 at the neck 46 is a second distance D". Second distance D" is shorter than first distance D'. Stated another way, the spline slot 30 is narrower near the end face 29 at the neck 46 defined by the rib 44 than it is at the bottom 32.

Referring now to FIGS. 1 and 2, second nozzle segment 50 includes an inner band 52 that is connected to an outer band 53 by an airfoil 54. The outer band 53 has an inboard surface 55 and an outboard surface 57. An end face 59 of the outer band 53 is positioned between the inboard surface 55 and the outboard surface 57.

Referring now to FIGS. 1-3, a spline slot 60 is defined in the outer band 50 and extends inward from the end face 59. The spline slot 60 is configured to receive the spline seal 80. Spline slot 60 is defined in the outer band 53 such that the spline slot 60 is defined by a bottom 62, and the inboard wall 64 and an outboard wall 66. Two end walls are positioned opposite each other and extend from the bottom 62 along the inboard wall 64 and the outboard wall 66 to the end face 59. The inboard wall 64 and the outboard wall 66 and the end walls extend from the bottom 62 to a rim 42 at the end face 59.

Referring now to FIG. 3, the inboard wall 64 and the outboard wall 66 are spaced apart a first distance D' near the bottom 62. A rib 74 is formed on at least one of the inboard wall 64 and the outboard wall 66 such that the rib 74 defines a surface that extends away from a plane generally defined by the respective wall.

In the illustrated example the rib 74 has a convex curved cross-sectional shape; for example the cross-section may be semicircular. In the completed component, the rib 74 is part of an integral, unitary, or monolithic hole with the remainder of the seal slot 60, but may be formed separately from the remainder of the seal slot 60, as shown by the dashed lines. As will be described in further detail below, the rib 74 may be formed using an additive manufacturing process.

The rib 74 defines a neck 76 in the spline slot 60 such that the shortest distance between the inboard wall 64 and the outboard wall 66 is narrower at the neck 76 than shortest distance near the bottom 62. The shortest distance between the inboard wall 64 and the outboard wall 66 at the neck 76 is a second distance D". Second distance D" is shorter than first distance D'. Stated another way, the spline slot 60 is narrower near the end face 29 at the neck 76 defined by the rib 74 than it is at the bottom 62.

Referring now to the spline seal 80 as shown in FIG. 3, the spline seal 80 is generally rectangular in cross-section and includes a first end 82 and a second end 84. Spline seal 80 has a body section 88 positioned between the first end 82 and the second end 84. Body section 88 has a width B and width B is smaller than second distance D". As a result, the body section 88 is configured to be received at any depth within the spline slot 30.

It should be noted that the ribs 44 operate to limit and restrict leakage pathways otherwise formed by the clearance between the spline seal 80 and inboard wall 34, outboard wall 36, bottom 32 of the spline slot 30. Likewise, the ribs 74 operate to limit and restrict leakage pathways formed by the clearance between the spline seal 80 and inboard wall 64, outboard wall 66, bottom 62 of the spline slot 30. In this regard, the narrow space between the spline seal 80 and the spline slot 30 and the spline slot 60 reduces leakage.

Several alternative structures related to the apparatus discussed above are described below. It should be noted that elements of a particular alternative sealing apparatus can be understood from the description of elements of the sealing assembly 10 having similar numbers in different 100s series. Stated another way, elements having similar reference numbers that differ only in their 100s series, refer to substantially similar structures unless indicated otherwise.

Figure 4:
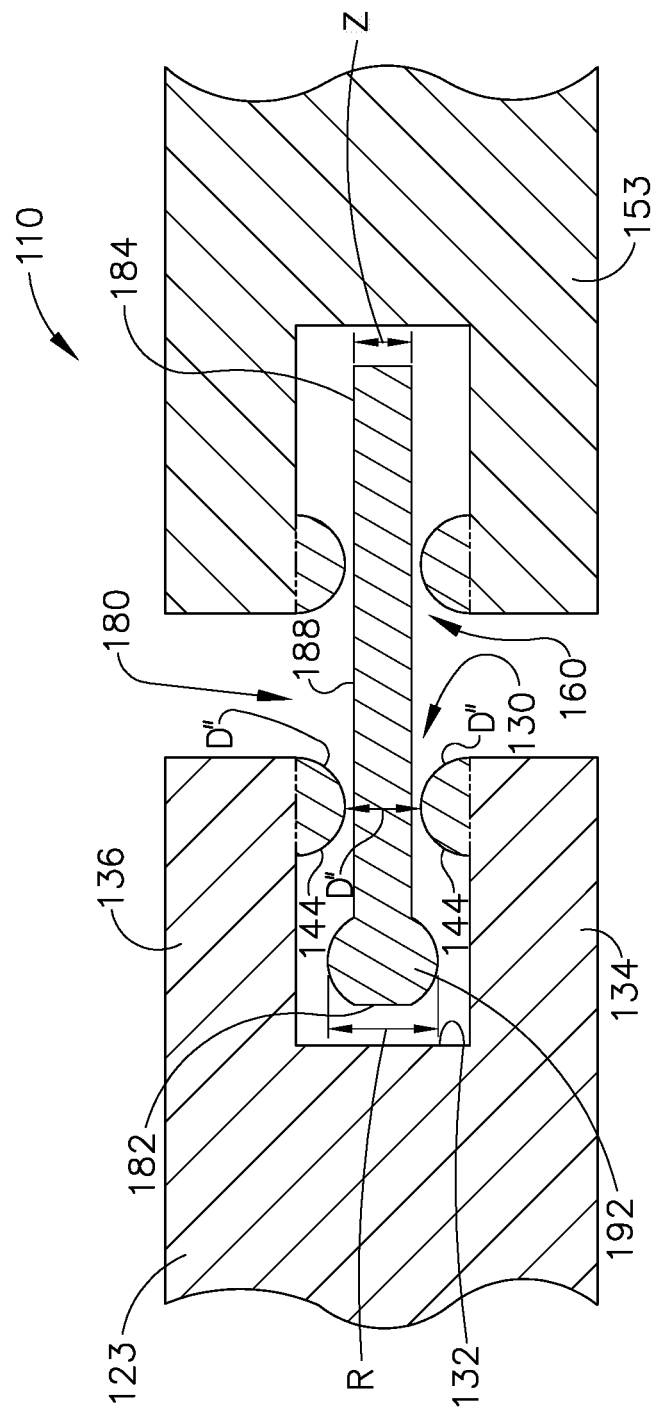
FIG. 4 is a partial cross-sectional view of another embodiment of the apparatus as shown in FIG. 3.

Referring now to FIG. 4 which shows an alternative sealing apparatus 110. Alternative sealing apparatus 110 includes an outer band 123 and an outer band 153. The outer band 123 includes a slot 130 that is configured to receive one end of a spline seal 180. The outer band 153 includes a spline slot 160 and is configured to receive another end of the spline seal 180. Two ribs 144 are formed on an inboard wall 134 and an outboard wall 136 of the spline slot 130. Spline 180 is generally rectangular in cross-section and includes a first end 182 and a second end 184. Spline 180 has a body section 188 positioned between the first end 182 and the second end 184. Body section 188 has a width Z and width Z is smaller than second distance D" thus the body section 188 is configured to be received at any depth within the spline slot 130.

However, the first end 182 expands away from the body section 188 such that the first end 182 has a width R and width R is larger than second distance D" but smaller than first distance D'. The first end 182 may be considered as a "retaining section." In this regard the first end 182 is configured to be received between the neck 146 and the bottom 132 of the spline slot 130.

Spline slot 130 and the spline 180 are configured such that, when the spline 180 is positioned within the spline slot 130 with the first end 182 of the spline 180 between the neck 146 of the spline slot 130 and the bottom 132 of the spline slot 130, removal of the spline 180 from the spline slot 130 would be impeded by the neck 146. Stated another way, the spline 180 can be considered as "trapped" in the slot 130.

Figure 5:
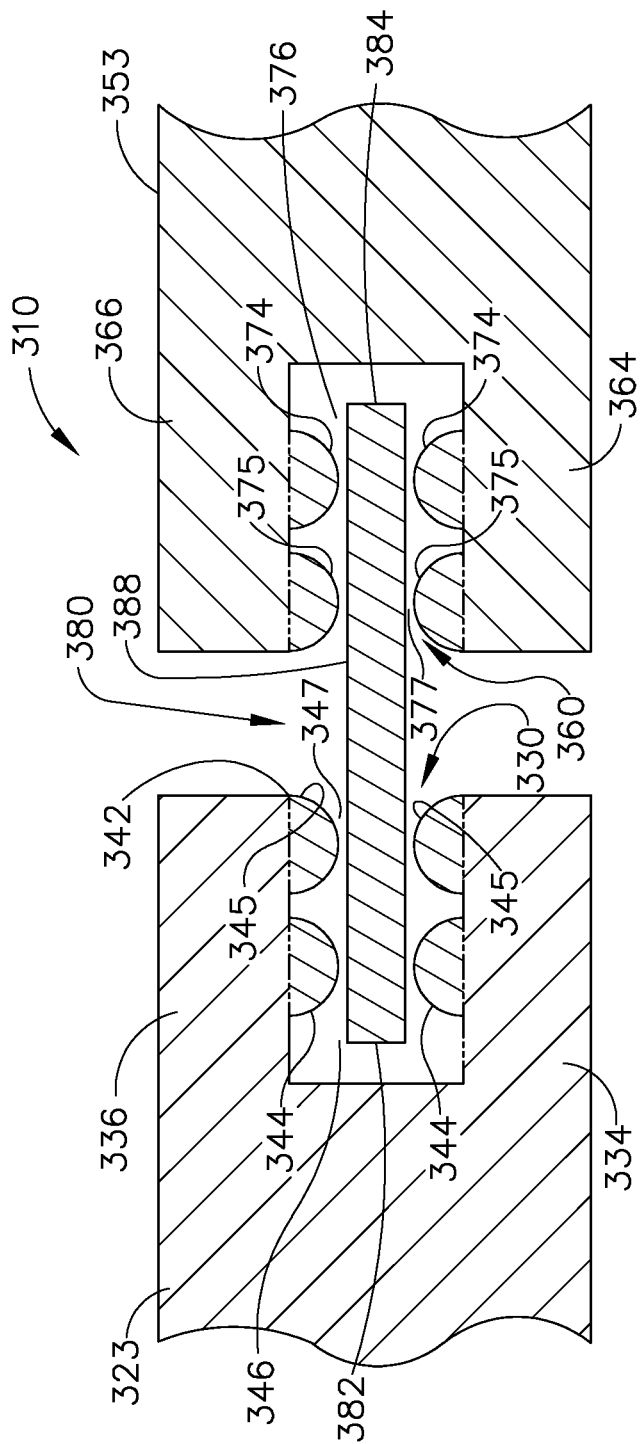
FIG. 5 is a partial cross-sectional view of another embodiment of the apparatus as shown in FIG. 3.

Referring now to FIG. 5, another alternative sealing apparatus 310 includes a first outer band 323 and a second outer band 353. First outer band 323 includes a spline slot 330. Spline slot 330 includes a first neck 346 and a second neck 347 and a rim 342. The first neck 346 is formed of two opposing ribs 344 wherein one extends from the inboard wall 334 and the other extends from the outboard wall 336.

The second neck 347 is defined by two opposing ribs 345 wherein one extends from the inboard wall 334 and the other extends from the outboard wall 336. Second neck 347 is spaced away from the first neck 346 and positioned between rim 342 and the first neck 346.

A spline slot 360 is defined in the second outer band 353 and includes a first neck 376 and a second neck 377. The first neck 376 is formed of two opposing ribs 374 wherein one extends from the inboard wall 364 and the other extends from the outboard wall 366. The second neck 377 is defined by two opposing ribs 375 wherein one extends from the inboard wall 364 and the other extends from the outboard wall 366. As shown in FIG. 5, second neck 377 is spaced away from the first neck 376.

In this regard, there is provided a spline 380. Spline 380 has a first end 382 and a second end 384. A body 388 is positioned between the first end 382 and the second end 384. First end 382 is dimensioned such that it is configured to be received within the spline slot 330 of the first outer band 323 such that the body 346 passes through the necks 346 and 347 of the first outer band 323. Likewise, the second end 384 of the spline 380 is dimensioned such that it is configured to pass through the necks 376 and 377 of the spline slot 360 of the second outer band 353.

Figure 6:
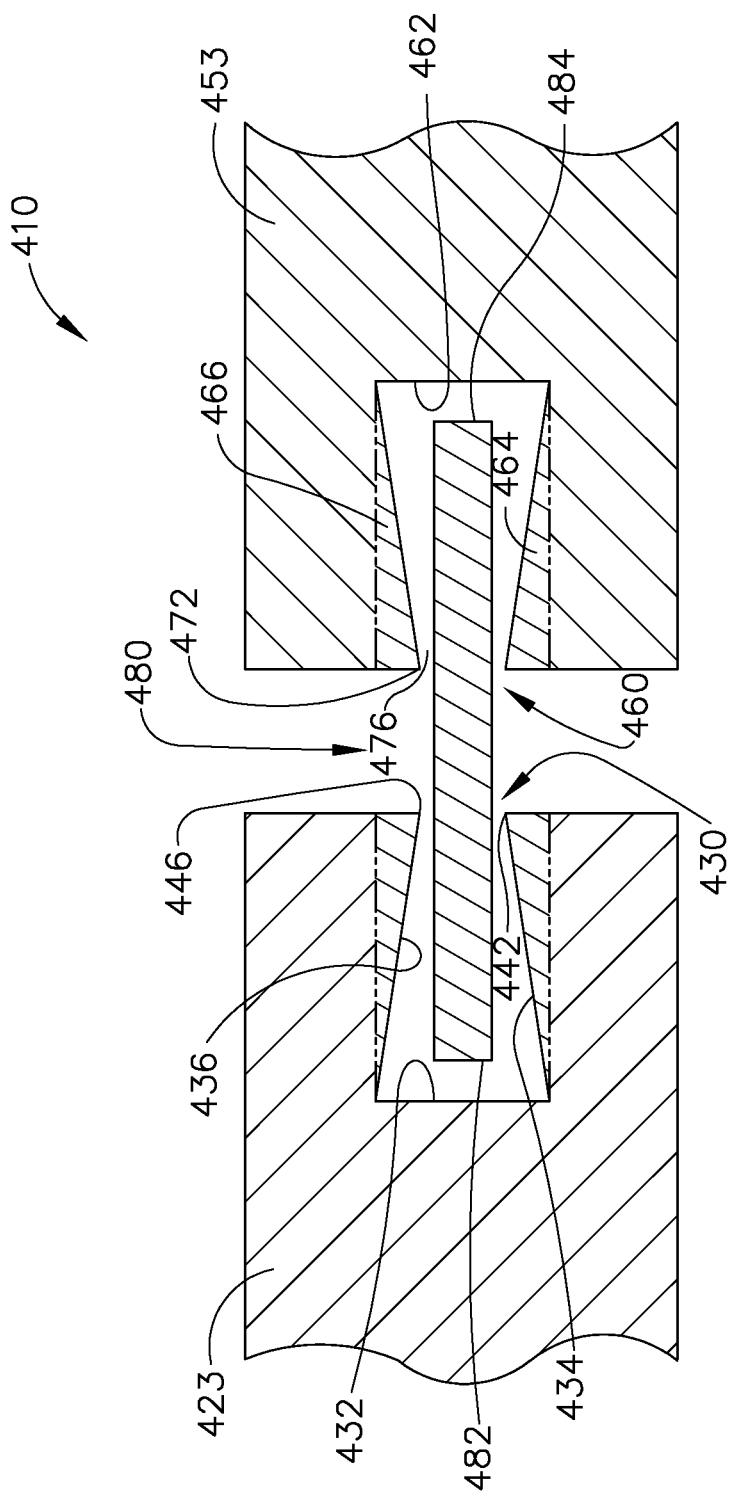
FIG. 6 is a partial cross-sectional view of another embodiment of the apparatus as shown in FIG. 3.

In another alternative sealing apparatus 410 shown in FIG. 6, there is provided a first outer band 423 and a second outer band 453. A spline slot 430 is defined in the first outer band 423. Spline slot 430 includes a bottom 432 and an inboard wall 434 and an outboard wall 436. Spline slot 430 is configured such that the inboard wall 434 and the outboard wall 436 slope from the bottom 432 towards each other such that the minimum distance across the spline slot 430 at a rim 442 is shorter than minimum distance across the spline slot 430 at the bottom 432. In this regard, the inboard wall 434 and the outboard wall 436 are sloped toward each other from the bottom 432 such that a neck 446 is formed at rim 442.

Continuing to refer to FIG. 6, the second outer band 453 includes a spline slot 460. Spline slot 460 includes a bottom 462 and an inboard wall 464 and an outboard wall 466. Spline slot 460 is configured such that the inboard wall 464 and the outboard wall 466 slope from the bottom 462 towards each other such that the minimum distance across the spline slot 460 at a rim 472 is shorter than minimum distance across the spline slot 460 at the bottom 462. In this regard, the inboard wall 464 and the outboard wall 466 are sloped toward each other from the bottom 462 such that a neck 476 is formed at rim 472. Spline slots 430 and 460 are configured to receive opposite ends 482, 484 of the spline 480 as shown in FIG. 6.

Figure 7:
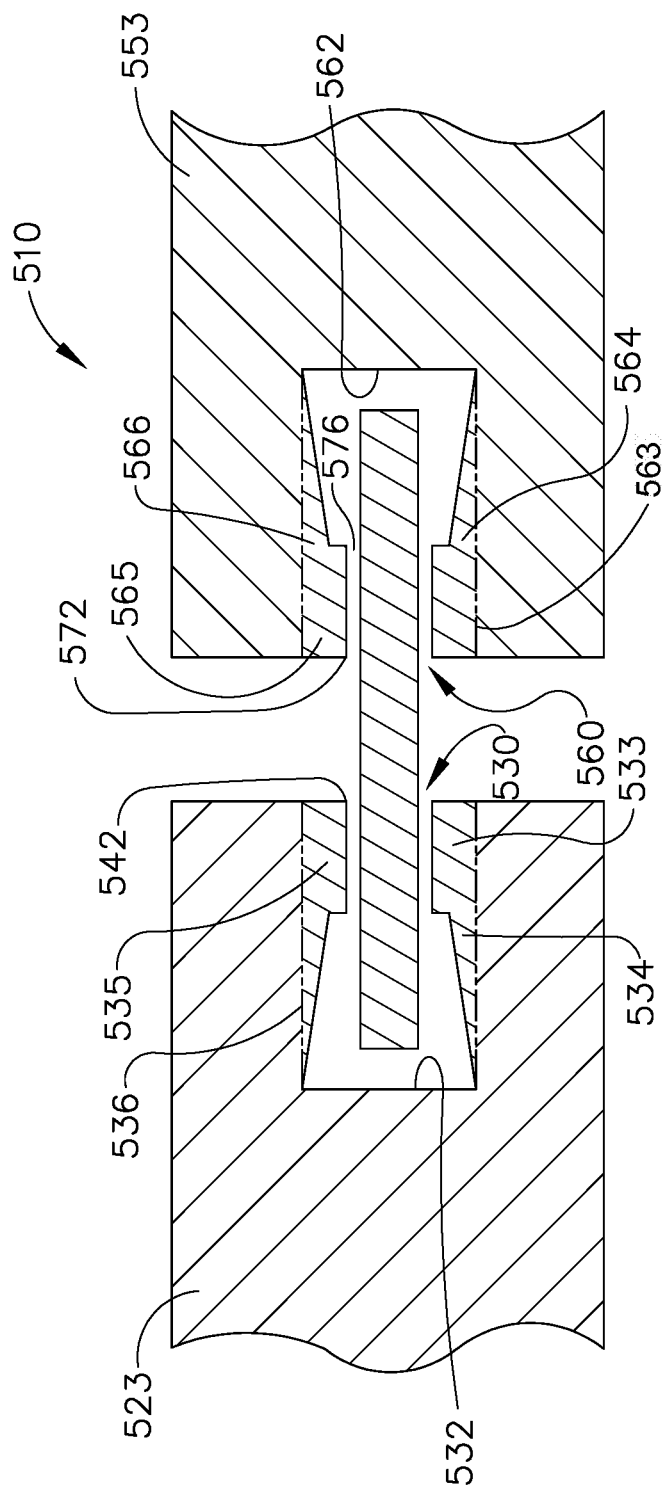
FIG. 7 is a partial cross-sectional view of another embodiment of the apparatus as shown in FIG. 3.

In another alternative sealing apparatus 510 shown in FIG. 7, there is provided a first outer band 523 and a second outer band 553. A spline slot 530 is defined in the first outer band 523. Spline slot 530 includes a bottom 532 and an inboard wall 534 and an outboard wall 536. Spline slot 530 is configured such that the inboard wall 534 and the outboard wall 536 slope from the bottom 532 towards each other such that the minimum distance across the spline slot 530 at a rim 542 is shorter than the minimum distance across the spline slot 530 at the bottom 532. In this regard, the inboard wall 534 and the outboard wall 536 are sloped toward each other from the bottom 532. The inboard wall 534 includes a block portion 533 positioned near rim 542 and the outboard wall 536 includes a block portion 535 that is also positioned near rim 542. The block portions 533 and 535 each define surfaces that are generally parallel to each other. Together, block portions 533 and 535 define a neck 546.

Continuing to refer to FIG. 7, the second outer band 553 includes a spline slot 560. Spline slot 560 includes a bottom 562 and an inboard wall 564 and an outboard wall 566. Spline slot 560 is configured such that the inboard wall 564 and the outboard wall 566 slope from the bottom 562 towards each other such that the minimum distance across the spline slot 560 at a rim 572 is shorter than minimum distance across the spline slot 560 at the bottom 562. In this regard, the inboard wall 564 and the outboard wall 566 are sloped toward each other from the bottom 562. The inboard wall 564 includes a block portion 563 positioned near rim 572 and the outboard wall 566 includes a block portion 565 that is also positioned near rim 572. The block portions 563 and 565 each define surfaces that are generally parallel to each other. Together, block portions 563 and 565 define a neck 576. Spline slots 530 and 560 are configured to receive opposite ends of the spline 580.

Figure 8:
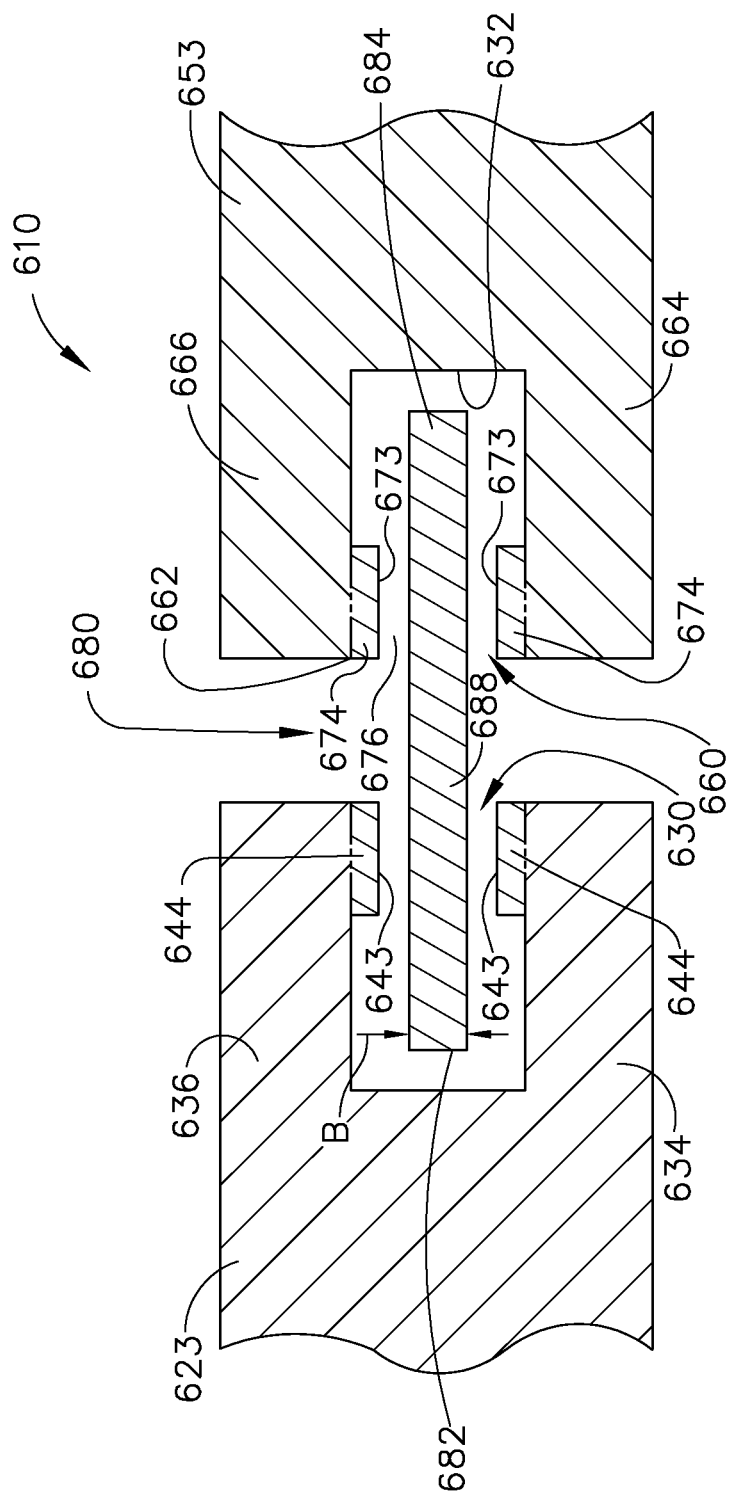
FIG. 8 is a partial cross-sectional view of another embodiment of the apparatus as shown in FIG. 3.

Referring now to FIG. 8 which shows another alternative sealing apparatus 610, there is shown a first outer band 623 and a second outer band 653. First outer band 623 includes a spline slot 630 that has a bottom 632 and the inboard wall 634 and an outboard wall 636. Opposing ribs 644 are defined on the inboard wall 634 and the outboard wall 636 respectively. The opposing ribs 644 are positioned adjacent to rim 642, and each rib 644 includes a flat 643. Flats 643 are substantially parallel to each other. Opposing ribs 644 are spaced apart from the bottom 632 such that opposing ribs 644 define a neck 646.

As shown in FIG. 8, the second outer band 653 includes a spline slot 660 that has a bottom 662 and the inboard wall 664 and an outboard wall 666. Opposing ribs 674 are defined on the inboard wall 664 and the outboard wall 666 respectively. Opposing ribs 674 that are positioned adjacent to rim 672, and each rib 674 includes a flat 673. Flats 673 are substantially parallel to each other. Opposing ribs 674 are spaced apart from the bottom 662 such that opposing ribs 674 define a neck 676.

Sealing assembly 610 includes a spline seal 680. The spline seal 680 is generally rectangular in cross-section and includes a first end 682 and a second end 684. Spline seal 680 has a body section 688 positioned between first end 682 and the second end 684. Body section 688 has a width B and width B is smaller than second distance D". As a result, the body section 688 is configured to be received at any depth within the spline slot 630.

Figure 9:
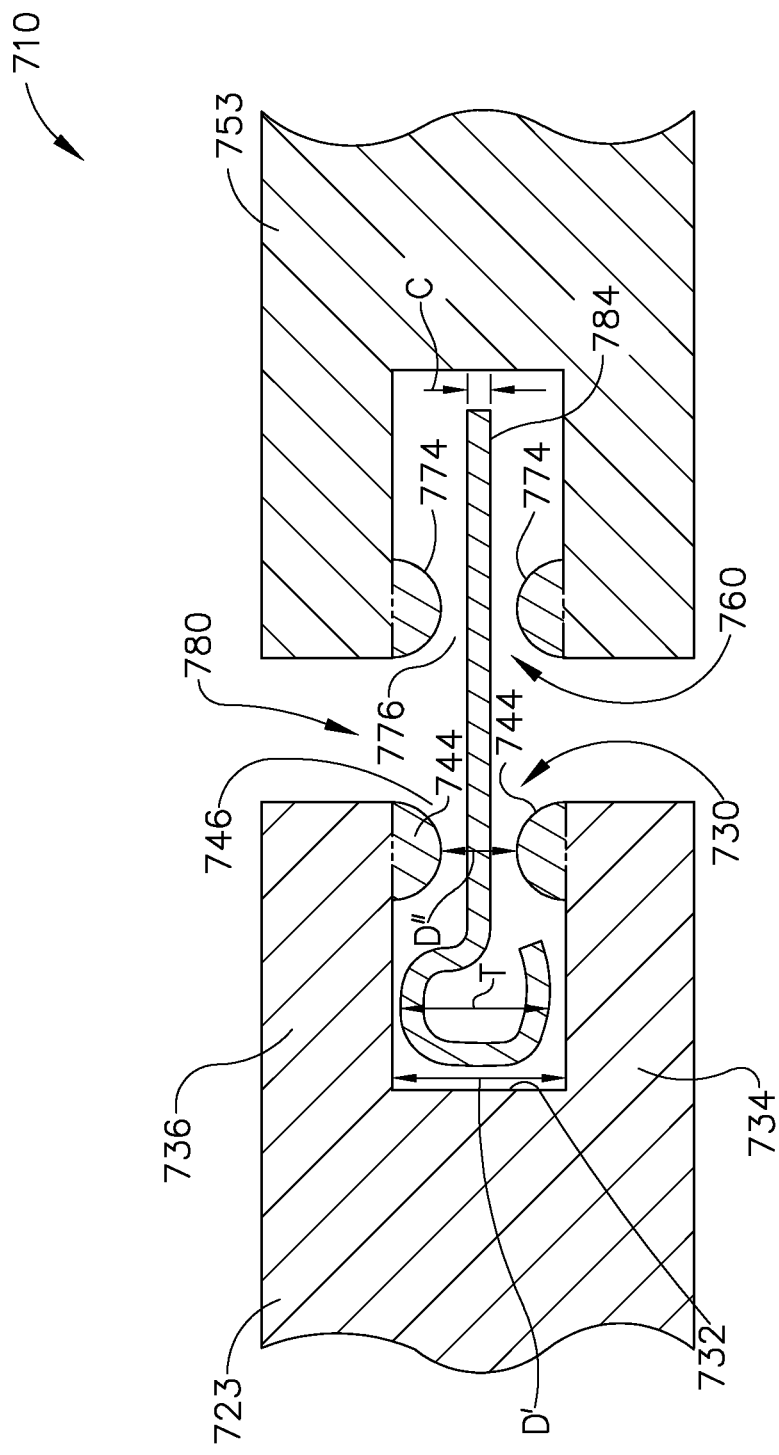
FIG. 9 is a partial cross-sectional view of another embodiment of the apparatus as shown in FIG. 3.

FIG. 9 shows a sealing apparatus 710 that includes a first outer band 723 and a second outer band 753. First outer band 723 includes a spline slot 730. Second outer band 753 includes a spline slot 760. Spline slot 760 includes an inboard wall 734 and an outboard wall 736. Spline slots 730 and 760 are configured such that they have necks 746 and 776 respectively, defined by ribs 744 and 774. Sealing apparatus 710 includes a spline 780 which has a first selectively compressible end 782, a second end 784 and a body 788 positioned between first end 782 and the second end 784.

Continuing to refer to FIG. 9, first end 782 has a width T which is greater than width D" when in a normal, uncompressed, configuration. First end 782 is configured to be compressed upon insertion within slot 730 as it passes through neck 746. Once positioned between neck 746 and a bottom 732 first end 782 is configured to expand such that it again has a width T. The first end 782 is configured such that spline seal 780 cannot be removed from spline slot 730 when the first end 782 is between the bottom 732 and the neck 746. In this regard, the first end 782 of the spline 780 is configured to retain width T when the spline 780 is pulled in a direction such that first end 782 moves away from the bottom 732 toward the neck 746. Because width T is greater than the width across neck 746, i.e., width D", the spline seal 780 cannot be withdrawn from the spline slot 730 once it has been inserted into the spline slot 730. Thus once inserted into spline slot 730, spline 780 is trapped and retained by first outer band 723. In contrast, the second end 784 of the spline 780 is dimensioned C such that it can pass through the neck 776 of the spline slot 760 of the second outer band 753 both when the second end 784 is inserted into the spline slot 760 and removed from the spline slot 760.

Figure 10:
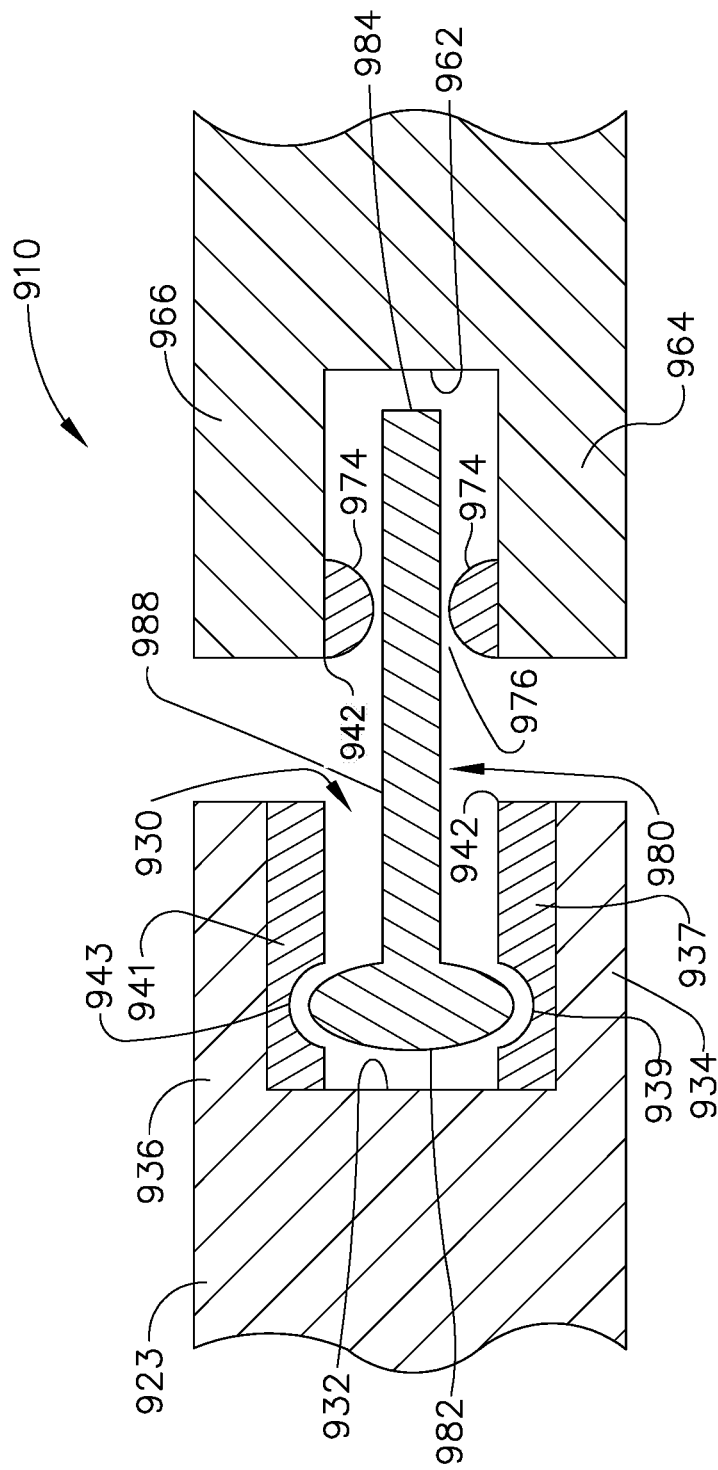
FIG. 10 is a partial cross-sectional view of another embodiment of the apparatus as shown in FIG. 3.
Figure 11:
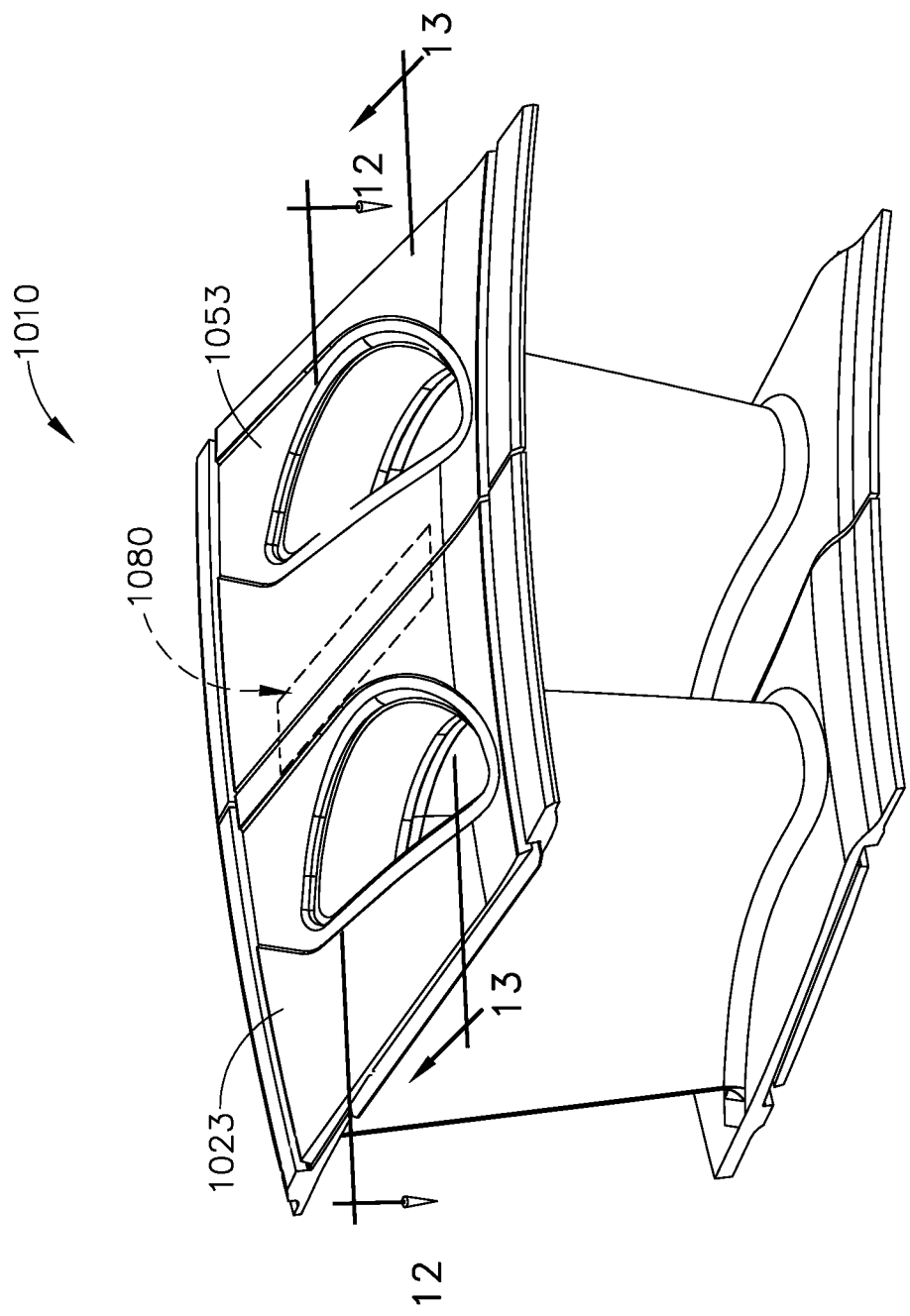
FIG. 11 is a perspective view of two nozzle segments that together form a sealing apparatus.
Figure 12:
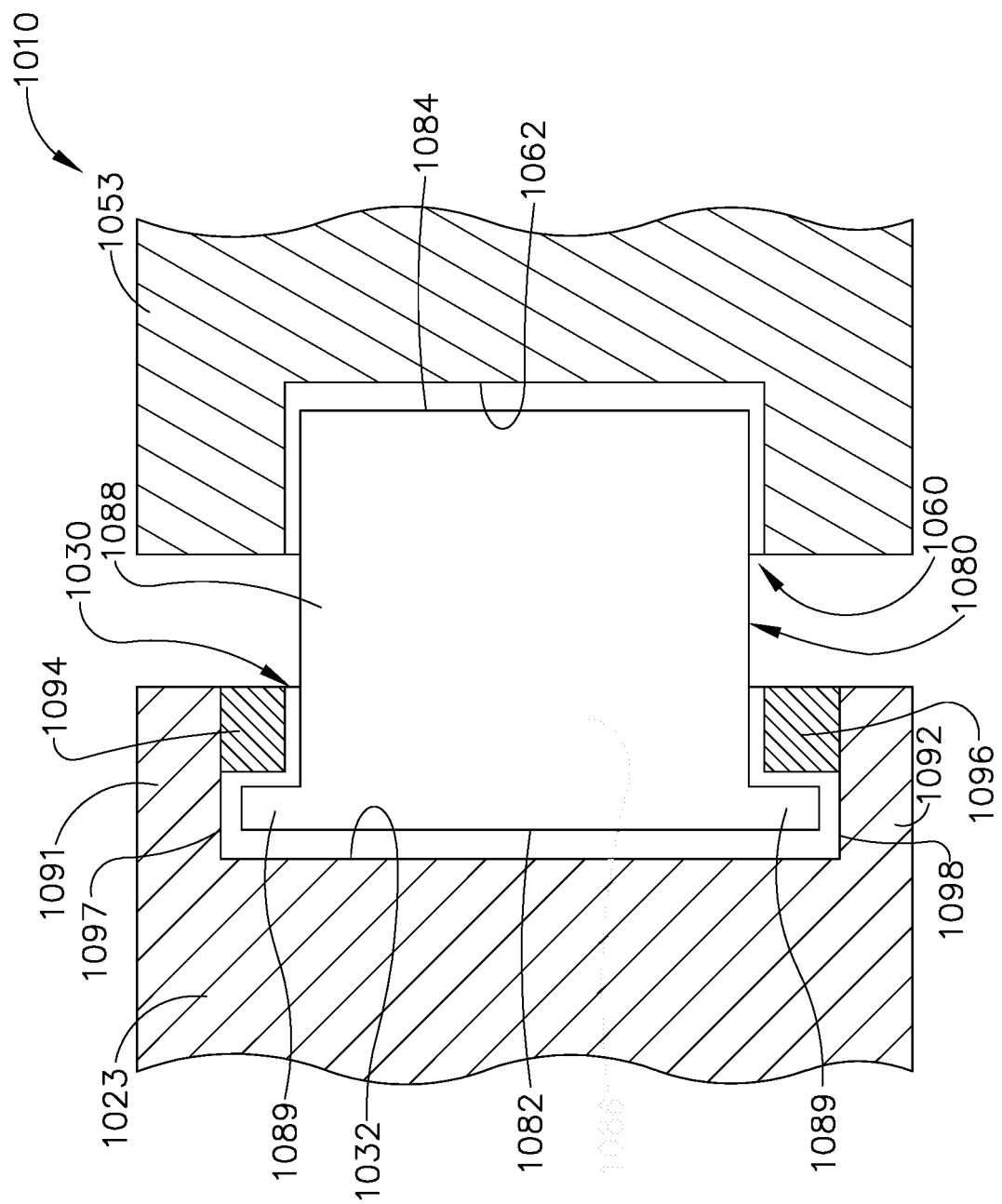
FIG. 12 is a partial cross-sectional view of the apparatus as shown in FIG. 11 taken along the line 13-13.

Referring now to FIGS. 10-12, two alternative sealing apparatuses are shown in which sealing splines each have one end that is trapped within its respective seal slot.

Referring now to FIG. 10 which shows an alternative sealing apparatus 910, a first outer band 923 includes a spline slot 930. Spline slot 930 includes a bottom 932, an inboard wall 934 and an outboard wall 936 which extend from the bottom 932 to a rim 942.

A facing layer 937 is positioned on inboard wall 934. Facing layer 937 defines a notch 939. Notch 939 is configured to receive a portion of expanded first end 982 of spline seal 980. A facing layer 941 is positioned on outboard wall 936. A notch 943 is defined by the facing layer 941 and is positioned opposite the notch 939. The notch 941 is configured to receive a portion of an expanded first end 982 of a spline seal 980 (discussed further below).

A second outer band 953 is positioned adjacent to the first outer band 923 and includes a spline slot 960. Spline slot 960 includes a bottom 962, and the inboard wall 964 and an outboard wall 966 which extend from the bottom 962 to a rim 942. It should be noted that the inboard wall 964 and the outboard wall 966 are generally parallel. A rib 974 is defined on the inboard wall 964. The rib 974 is defined on outboard wall 966. Together ribs 974 define a neck 976.

A spline 980 is configured to be received within the spline slots 930 and 960. In this regard, the spline 980 has a first end 982 and a second end 984 connected by the body 988. First end 982 of the spline 980 is dimensioned such that it can be positioned within the spline slot 930 such that the first end 982 extends beyond the general plane of the facing layer 941 into notch 943 and beyond the general plane of the facing layer 937 into notch 939. Continuing to refer to FIG. 10, the second end 984 of the spline 980 is configured to pass through neck 976. Thus, the spline seal 980 can be inserted directly into the spline slot 960 of second outer band 953. However the spline seal 980 cannot be inserted directly into spline slot 930 between the facing layers 937 and 941. A method for forming facing layers 937 and 941 via additive manufacturing, such that facing layers 937 and 941 and notches 939 and 943 are formed around expanded end 982 is described below.

Figure 13:
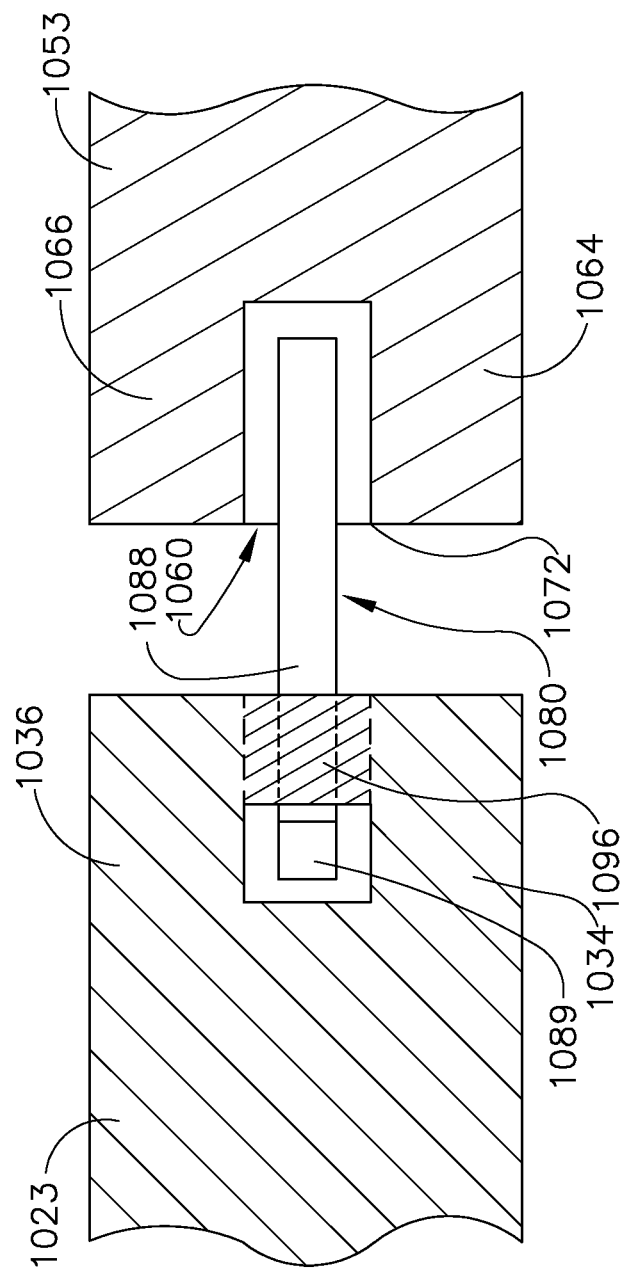
FIG. 13 is a partial cross-sectional view of the apparatus as shown in FIG. 11 taken along the line 13-13.
Figure 14:
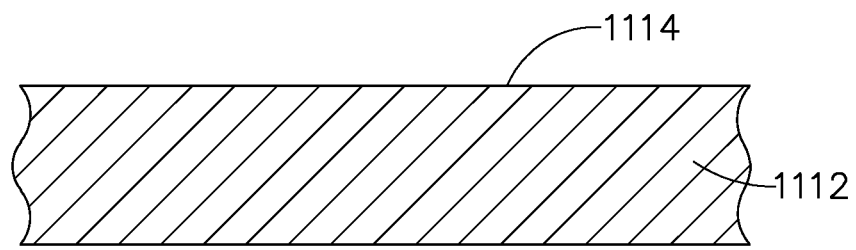
FIG. 14 is a schematic view of a portion of a turbine component.

Referring now to FIGS. 11-13 which show yet another alternative sealing apparatus, as shown in FIG. 11 a first outer band 1023 is positioned adjacent to a second outer band 1053 and joined by a spline 1080 to form a sealing assembly 1010. It should be noted that the external features of the sealing assembly 1010 shown in FIG. 12 are substantially similar to that of the sealing assembly 10 shown in FIG. 1. However, internal features of the first outer band 1023, second outer band 1053 and features of the spline 1080 vary from those of corresponding elements of the sealing assembly 10.

Referring now to FIGS. 12 and 13, the first outer band 1023 includes a spline slot 1030. Spline slot 1030 includes a bottom 1032, a first end wall 1091, a second end wall 1092, an inboard wall 1034, and an outboard wall 1036. A first lip 1094 is defined by the first end wall 1091 and a second lip 1096 is defined on the second end wall 1092. The first lip 1094, the first end wall 1091, and the bottom 1032 define a first recess 1097. The second lip 1096, the second end wall 1092, and the bottom 1032 define a second recess 1098.

The second outer band 1053 is positioned adjacent to the first outer band 1023 and includes a spline slot 1060. Spline slot 1060 includes a bottom 1062, and the inboard wall 1064 and an outboard wall 1066 which extend from the bottom 1062 to a rim 1072.

A spline 1080 is configured to be received within the spline slots 1030 and 1060. In this regard, the spline 1080 has a first end 1082 and a second end 1084 connected by the body 1088. First end 1082 of the spline 1080 has two tabs 1089 that extend away from the first in 1082 of the spline 1080 into the respective first recess 1097 and the second recess 1098. In this manner, the spline 1080 is retained within the spline slot 1030 by the interaction of the two tabs 1089 with the first lip 1094 and the second lip 1096. It should be appreciated that spline 1080 cannot be inserted into spline slot 1030 as described above because the tabs 1089 would interfere with and be blocked by the first lip 1094 and the second lip 1096. Accordingly, spline 1080 must be inserted into spline slot 1030 prior to the formation of the first lip 1094 and the second lip 1096 according to a method utilizing the additive manufacturing process described below. Alternatively spline 1080 could be formed using a further additive manufacturing process described below as blocks 1094 and 1096 are formed concurrently.

The sealing apparatus described above can be better understood by description of the manufacture thereof. In this regard, an additive manufacturing process may be utilized to form the complex components of the various sealing apparatuses. The process begins with an existing part surface. The term "part" refers both to an otherwise-complete component as well as a part in an uncompleted state, such as a rough casting, blank, preform, or part manufactured by an additive manufacturing process. For example the ribs or other neck structures of the slots described above can be formed by an additive manufacturing process. Initially, the part surface is appropriately prepared as required to accept bonding of a powdered material thereto. For example, contaminants may be removed and/or the surface roughened by solvents, fluoride ion cleaning, grit blasting, etc.

Next, a powder is adhered to the surface. The powder may be any suitable material for additive manufacturing. By way of example and not limitation, the powder may be one of the following: metallic, polymeric, organic, ceramic compositions, metal-ceramic composites, abradable materials, and a combination thereof.

As used herein, the term "adhere" refers to any method that causes a layer to adhere to the surface with sufficient bond strength so as to remain in place during a subsequent powder fusion process. "Adhering" implies that the powder has a bond or connection beyond simply resting in place under its own weight, as would be the case with a conventional powder-bed machine. For example, the surface may be coated with an adhesive product, which may be applied by methods such as dipping or spraying. One non-limiting example of a suitable low-cost adhesive is Repositionable 75 Spray Adhesive available from 3M Company, St. Paul, Minn. 55144 US. Alternatively, powder could be adhered by other methods such as electrostatic attraction to the part surface, or by magnetizing the powder (if the part is ferrous). As used herein, the term "layer" refers to an incremental addition of mass and does not require that the layer be planar, or cover a specific area or have a specific thickness.

The powder may be applied by dropping or spraying the powder over the surface, or by dipping the part in powder. Powder application may optionally be followed by brushing, scraping, blowing, or shaking as required to remove excess powder, for example to obtain a uniform layer. It is noted that the powder application process does not require a conventional powder bed or planar work surface, and the part may be supported by any desired means, such as a simple worktable, clamp, or fixture.

Once the powder is adhered, a directed energy source (such as a laser or electron beam) is used to melt a layer of the structure being built. The directed energy source emits a beam and a beam steering apparatus is used to steer the beam over the exposed powder surface in an appropriate pattern. The exposed layer of the powder is heated by the beam to a temperature allowing it to melt, flow, and consolidate. This step may be referred to as fusing the powder.

The fusing step may be followed by removing any unfused powder (e.g. by brushing, scraping, blowing, or shaking) as required. This step is optional, meaning it may or may not be required or desired for a particular application.

This cycle of adhering powder, removing excess powder, and then directed energy melting the powder is repeated until the entire component is complete.

FIGS. 16 through 19 illustrate sequential steps in the process of manufacturing and additive structure 1132, using the process described above, initially, the substrate 1112 is provided and the surface 1114 is prepared as required.

Figure 15:
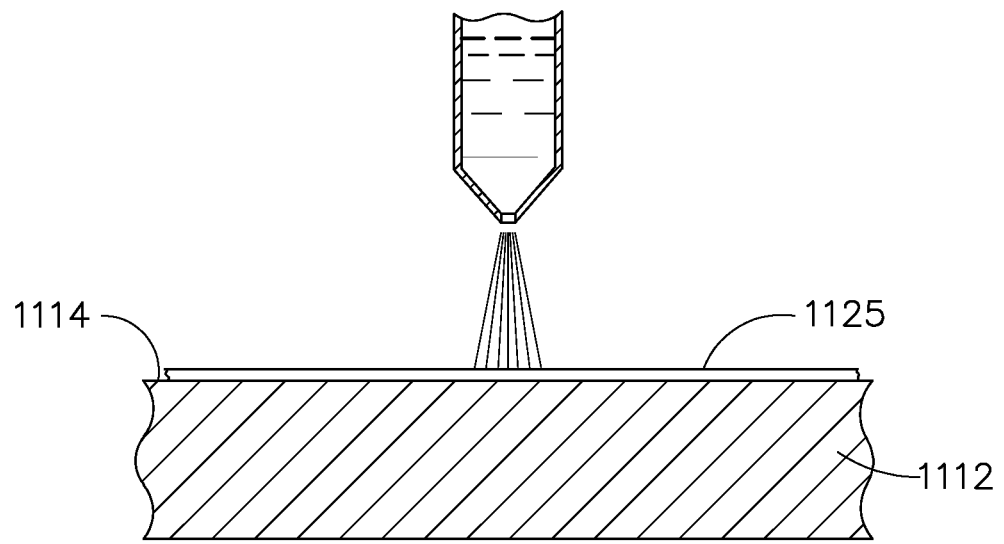
FIG. 15 is a schematic view of a portion of the turbine component of FIG. 15, showing adhesive being applied.
Figure 16:
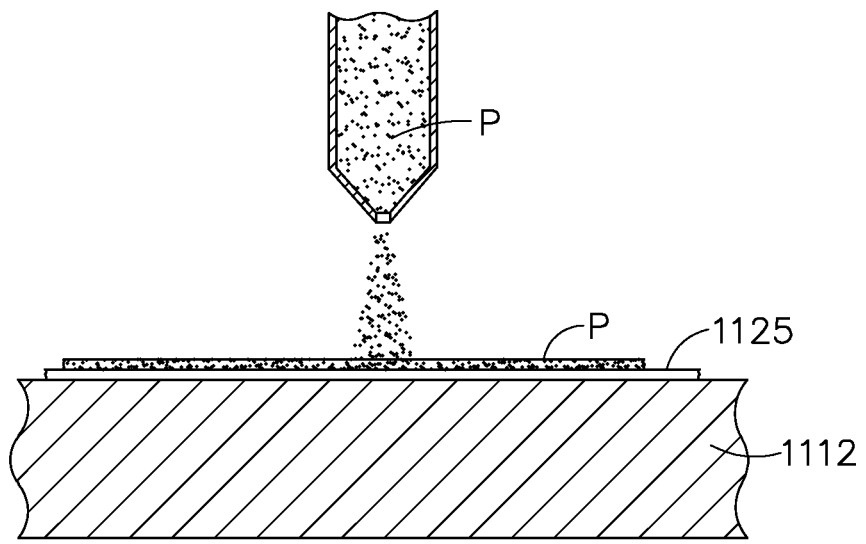
FIG. 16 is a schematic view of a portion of the turbine component and layer of adhesive of FIG. 15, showing powder being applied.

Powder P is then adhered to the surface 1114. In the illustrated example the powder P is adhered by first applying an adhesive 1125 to the surface 1114 (FIG. 15), and then applying the powder P over the adhesive 1125. Excess powder P may be removed. FIG. 16 shows the substrate 1112 after application of a layer of powder P. As a nonlimiting example, the thickness of the powder layer may be about 10 µm (0.0004 in.)

Figure 17:
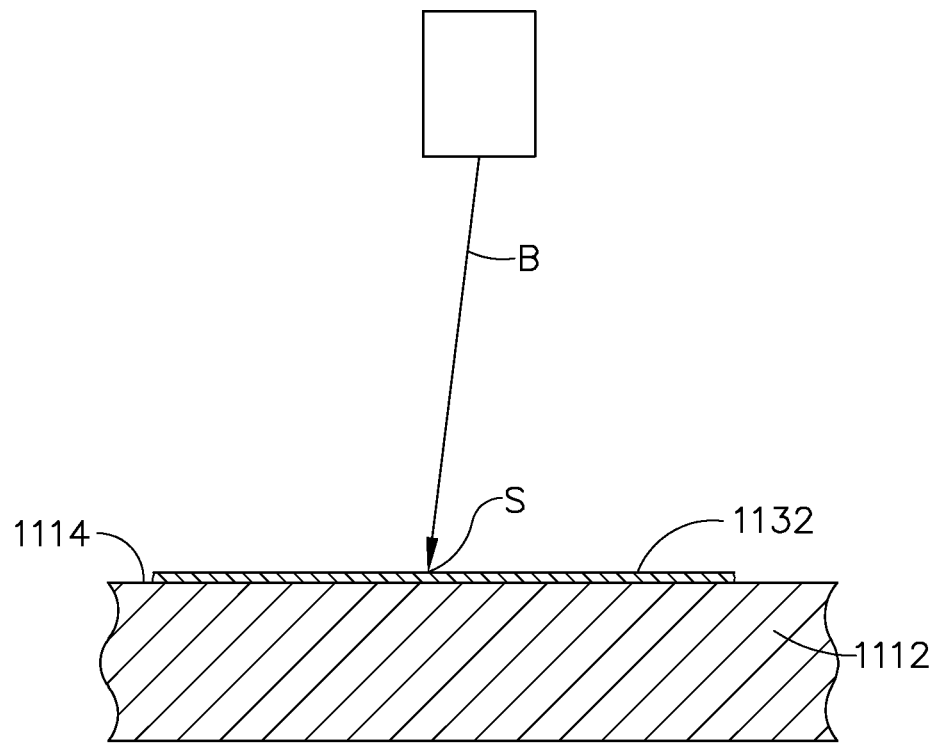
FIG. 17 is a schematic view of a portion of the turbine component of FIG. 17, showing powder being fused.

A directed energy source (such as a laser or electron beam gun) is used to melt the layer of powder P in a pre-programmed pattern representing a desired structure, as shown in FIG. 17. The directed energy source emits a beam "B" and a beam steering apparatus is used to steer the focal spot "S" of the beam B over the exposed powder surface in an appropriate pattern. The exposed layer of the powder P is heated by the beam B to a temperature allowing it to melt, flow, and consolidate. Powder P and the surface 1114 heated by the beam B such that the consolidated layer formed by fused powder P is fused and/or attached to the surface 1114.

An advantage of the additive manufacturing process is that blind areas can be formed that would be impractical and/or impossible to form using conventional means. By way of example and referring in part to FIG. 3 that shows the sealing apparatus 10, the ribs 44 of spline slot 30 can be formed using the additive process as follows. First, the outer band 23 having a spline slot 30 formed therein is oriented such that spline slot 30 can receive and retain powder. The relative positions of the bottom 32 and the rim 42 can be any orientation in which powder can be retained satisfactorily over the surface that is to be modified. For purposes of illustration, in this step the orientation of the spline slot 30 will be considered to be vertical. Stated another way, the rim 42 of spline slot 30 is positioned over the bottom 32 of spline slot 30. As indicated in the exemplary additive manufacturing process described above, the adhesive step, while normally first, is optional. In this case, no adhesive is applied before the first powder is introduced. The powder is introduced to cover the bottom 32 until slot 30 is filled to a level approximately that of the nearest portion of rib 44 to bottom 32. The powder is then fused at this point in the areas in which it is desired to have rib 44. The ribs 44 continue to be built up by repeated applications of adhesive, a powder, and fusing energy. At each layer, the powder extends from the inboard wall 34 to the outboard wall 36. However the powder is only fused to the extent of the ribs 44. In this manner neck 46 is produced. It should be appreciated that, in some embodiments, a layer can be fused only to a previous layer and not to either the inboard wall 34 or the outboard wall 44, or the bottom 32.

Referring now to the method of additive manufacturing for producing sealing apparatus 310 shown in FIG. 5, it should be appreciated that it is similar to the method for producing sealing apparatus 10 except the formation of ribs is repeated. In this regard the ribs 344 are formed first, then at least one layer of powder predetermined thickness is provided across the full extent of the width of the spline slot 330. Then the ribs 345 are formed. Ribs 374 and 375 of the second spline slot 360 are formed in a similar manner.

The additive manufacturing process can also be used to form spline 180 and ribs 144 sequentially such that spline 180 is introduced within spline slot 130 of outer band 123 without interference of the ribs 144. In this regard, outer band 123 is oriented as described above such the powder can be placed on the bottom 132 of spline slot 130. The depth of the powder on the bottom 132 of spline slot 130 is adjusted such that it reaches a predetermined position of the first end 182 of the spline seal 180. At this point the alternating adhesive, fusing, and powder application steps described above are repeated as spline 180 is formed. In a predetermined layer of powder, powder is fused both in the area of the spline 180 and the areas of the ribs 144. Additional layers are provided where portions of both the ribs 144 and the spline 180 are fused until the ribs 144 are completed. Layers of powder continued to be added until the spline 180 is completed. By way of example and not limitation, powder layers positioned above outer band 123 during the formation of the spline seal 180 can be contained by one of the following: a temporary wall built around the perimeter of spline slot 130, a jig configured to receive outer band 123, a frame, and a combination thereof.

Referring to the other trapped spline seals shown in the figures, it should be appreciated that the spline slots and spline seals shown in FIGS. 9-13 can be produced using an additive method similar to that described above for sealing apparatus 10. Sealing apparatus 930 can be formed according to the additive manufacturing process described with regards to sealing apparatus 110 wherein the spline seal 980 is formed contemporaneously with facing layers 937 and 941, respectively.

The foregoing has described a sealing apparatus that includes complex spline slots and splines. The sealing apparatus that includes the spline slots and spline seals reduces leakage by restricting leakage flow path through the spline slots between the spline slot walls and seals. Such seal apparatuses can include curved seal slots and faces, curved splines, ribs that are not of constant cross-sectional shape or constant location along the slot length, other rib shapes, and other spline shapes. Such reduction in leakage results in increased efficiencies of the associated aircraft components.

The foregoing has also described a method for forming the sealing apparatus using additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing sealing apparatus(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A method of forming a sealing structure in a turbine component having a pre-existing seal slot, the seal slot including walls defining an opening therebetween, the method comprising using an additive manufacturing process to form a neck structure on at least one of the walls so as to reduce a size of the opening, the additive manufacturing process including the steps of:
    positioning the turbine component such that powder can be contained by the seal slot;
    adding powder to the seal slot until the powder is at a predetermined level relative to the walls;
    selectively fusing a portion of an uppermost layer of the powder; and
    removing un-fused powder from the seal slot so as to leave the neck structure in place.

2. The method according to claim 1 further comprising depositing an additional layer of powder on the uppermost layer of powder; and fusing at least some of the additional layer of powder to at least a portion of the fused section of the previous layer.

3. The method according to claim 2 further comprising fusing a part of a layer of powder to at least one of the walls.

4. The method of claim 1 further comprising repeating in a cycle the steps of adding and fusing to build up the structure in a layer-by-layer fashion.

5. The method of claim 4 wherein the structure is a rib attached to a wall of the slot.

6. The method of claim 4 further comprising adding at least one unfused layer before reinitiating the cycle of repeating the steps of depositing and fusing to build up another structure that is spaced-apart from the first structure.

7. The method of claim 1 wherein the turbine component comprises a metal alloy.

8. The method of claim 1 wherein the powder comprises a metal alloy.

9. A method of forming a sealing structure in a turbine component having a pre-existing seal slot sequentially with a spline seal, the seal slot including walls defining an opening therebetween and at least a portion of the spline seal positioned in the opening, the method comprising using an additive manufacturing process to form a neck structure on at least one of the walls so as to reduce a size of the opening and to form a spline seal having a retaining end positioned within the opening, wherein the neck structure interferes with the retaining end of the spline seal to prevent the spline seal from being pulled out of the seal slot, the method further comprising:
    positioning a turbine component such that powder can be contained by the seal slot;
    depositing powder to the seal slot until the powder is at a predetermined position of a first end of the spline seal; and
    fusing powder in the region of the spline seal while leaving powder that is not in the region of the spline seal unfused;
    repeating the depositing and fusing steps until the retaining end of the spline seal is formed; and
    continuing repeating the depositing and fusing steps to define spaced apart fused areas such that portions of the spline seal and portions of the neck structure are formed contemporaneously.

10. The method of claim 9 wherein the component comprises a metal alloy.

11. The method of claim 9 wherein the powder comprises a metal alloy.

12. A method of forming a sealing structure in a turbine component having a pre-existing seal slot, the seal slot including walls defining an opening therebetween, the method comprising:
    using an additive manufacturing process to form at least one neck structure on at least one of the walls so as to reduce a size of the opening, wherein the additive manufacturing process comprises the steps of:
        positioning a turbine component such that powder can be contained by the seal slot;
        adding powder to the seal slot until the powder is at a predetermined level relative to the walls;
        selectively fusing a portion of an uppermost layer of the powder;
        repeating in a cycle the steps of adding and fusing to build up a first neck structure in a layer-by-layer fashion; and
        adding at least one unfused layer before reinitiating the cycle of repeating the steps of depositing and fusing to build up a second neck structure that is spaced-apart from the first structure.

13. The method according to claim 12 further comprising depositing an additional layer of powder on the uppermost layer of powder; and fusing at least some of the additional layer of powder to at least a portion of the fused section of the previous layer.

* * * * *